United States Patent
Shiota

(10) Patent No.: US 12,391,217 B2
(45) Date of Patent: Aug. 19, 2025

(54) VEHICLE

(71) Applicant: TOYOTA JIDOSHA KABUSHIKI KAISHA, Toyota (JP)

(72) Inventor: Yuzuru Shiota, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/906,180

(22) Filed: Oct. 4, 2024

(65) Prior Publication Data
US 2025/0236267 A1     Jul. 24, 2025

(30) Foreign Application Priority Data
Jan. 22, 2024   (JP) .................................. 2024-007383

(51) Int. Cl.
| | | |
|---|---|---|
| *B62D 25/10* | (2006.01) | |
| *B60S 1/50* | (2006.01) | |
| *B62D 21/11* | (2006.01) | |
| *B62D 25/08* | (2006.01) | |

(52) U.S. Cl.
CPC ............... *B60S 1/50* (2013.01); *B62D 21/11* (2013.01); *B62D 25/082* (2013.01); *B62D 25/10* (2013.01)

(58) Field of Classification Search
CPC ...... B62D 25/12; B62D 25/105; B62D 25/10; B60S 1/50
See application file for complete search history.

(56) References Cited

U.S. PATENT DOCUMENTS

| | | | | |
|---|---|---|---|---|
| 4,153,291 | A * | 5/1979 | Conti | B60J 9/00 446/470 |
| 5,024,383 | A * | 6/1991 | Vaschetto | B62D 25/12 296/193.11 |
| 5,853,025 | A * | 12/1998 | Daneshvar | B60S 1/50 239/284.1 |
| 6,017,083 | A * | 1/2000 | Edgeller | B62D 63/06 296/100.07 |
| 6,167,976 | B1 * | 1/2001 | O'Neill | B62D 25/10 180/69.2 |

(Continued)

FOREIGN PATENT DOCUMENTS

| | | | | |
|---|---|---|---|---|
| DE | 19718594 | A1 * | 11/1998 | B60R 19/52 |
| DE | 102017008545 | A1 * | 3/2019 | B60S 1/50 |

(Continued)

OTHER PUBLICATIONS

FR_2933367_A1 FIT translation (Year: 2025).*
JP_H11180213_A FIT translation (Year: 2025).*

*Primary Examiner* — Paul N Dickson
*Assistant Examiner* — Maxwell L Meshaka
(74) *Attorney, Agent, or Firm* — SoraIP, Inc.

(57) ABSTRACT

The vehicle includes a vehicle body having a power unit room at a front portion of the vehicle, an in-vehicle device (such as a brake device) provided in the power unit room, a hood covering the power unit room, and a central garnish. The in-vehicle device includes a liquid amount confirmation unit (a brake reserve tank or the like) configured to be able to confirm the amount of stored liquid. Further, the central garnish is provided independently of the hood and is detachable from the hood, and covers the liquid amount confirmation unit (brake reserve tank or the like).

5 Claims, 2 Drawing Sheets

(56) References Cited

U.S. PATENT DOCUMENTS

| | | | | |
|---|---|---|---|---|
| 8,777,299 | B2 * | 7/2014 | Langford, Jr. | B62D 25/10 |
| | | | | 296/193.11 |
| 9,725,074 | B2 * | 8/2017 | Huebner | B60R 13/005 |
| 10,195,999 | B1 * | 2/2019 | Glickman | B62D 25/085 |
| 10,967,821 | B2 * | 4/2021 | Tanabe | B60R 13/105 |
| 2012/0280537 | A1 * | 11/2012 | Quirk | B62D 25/10 |
| | | | | 296/193.11 |
| 2014/0001793 | A1 * | 1/2014 | Langford, Jr. | B62D 25/10 |
| | | | | 296/193.11 |
| 2017/0137000 | A1 * | 5/2017 | Huebner | B60R 13/005 |
| 2020/0094759 | A1 * | 3/2020 | Tanabe | B60R 13/105 |

FOREIGN PATENT DOCUMENTS

| | | | | |
|---|---|---|---|---|
| DE | 202019105713 | U1 * | 12/2019 | |
| EP | 2886399 | A1 * | 6/2015 | B60R 21/36 |
| FR | 2933367 | A1 * | 1/2010 | B62D 25/105 |
| JP | H11-180213 | A | 7/1999 | |
| JP | 2012-140045 | A | 7/2012 | |

\* cited by examiner

VEHICLE

CROSS-REFERENCE TO RELATED APPLICATION

This application claims priority to Japanese Patent Application No. 2024-007383 filed on Jan. 22, 2024, incorporated herein by reference in its entirety.

BACKGROUND

1. Technical Field

The present disclosure relates to a vehicle.

2. Description of Related Art

Japanese Unexamined Patent Application Publication No. 11-180213 (JP 11-180213 A) discloses a vehicle in which a washer fluid amount can be checked easily. An engine compartment of the vehicle described in this document is provided with a washer tank that stores a washer fluid and a lamp for illuminating the washer tank. The body of the washer tank is made of a material that allows light to pass therethrough. The lamp is provided along an outer surface of the body of the washer tank. When the lamp is turned on and the inside of the body of the washer tank is illuminated, the remaining amount of the washer fluid (hereinafter simply referred to as "washer fluid amount") can easily be visually recognized.

SUMMARY

In the vehicle described in JP 11-180213 A, it is necessary to open and close a hood covering the engine compartment to check the washer fluid amount. Therefore, in the vehicle described in JP 11-180213 A, there is room for improvement from the viewpoint of improving workability at the time of checking (improving serviceability).

In view of the above fact, it is an object of the present disclosure to provide a vehicle in which workability at the time of checking can be improved.

A vehicle of one aspect includes:
a vehicle body including a power unit room at a front part of the vehicle;
an in-vehicle device provided in the power unit room and including a liquid amount check unit configured such that an amount of stored liquid is checkable;
a hood that covers the power unit room; and
a cover member that is provided independently of the hood, that is attachable to and detachable from at least either of the vehicle body and the hood, and that covers the liquid amount check unit.

In the vehicle of the above aspect, the in-vehicle device including the liquid amount check unit is provided in the power unit room, and the power unit room is covered with the hood. The cover member attachable to and detachable from at least either of the vehicle body and the hood is provided independently of the hood. By detaching the cover member, it is possible to visually recognize the liquid amount check unit. That is, by detaching the cover member without opening and closing the hood, it is possible to view and check the amount of liquid stored in the liquid amount check unit.

In the vehicle of the above aspect,
the cover member may be attached to the hood.

In the vehicle of the above aspect, by detaching the cover member attached to the hood, it is possible to view and check the amount of liquid stored in the liquid amount check unit. Further, the cover member can have a function as part of the hood.

In the vehicle of the above aspect,
the power unit room may be provided with a plurality of in-vehicle devices, and
a plurality of the liquid amount check units of the in-vehicle devices may be covered with the cover member common to the in-vehicle devices.

In the vehicle of the above aspect, by detaching the common cover member, it is possible to view and check the amounts of liquid stored in the liquid amount check units of the in-vehicle devices.

In the vehicle of the above aspect,
a suspension tower may be provided outside the power unit room in a vehicle width direction, and
the vehicle may include a second cover member that is provided independently of the hood, that is attachable to and detachable from at least either of the vehicle body and the hood, and that covers the suspension tower.

In the vehicle of the above aspect, the suspension tower can be accessed by detaching the second cover member. Thus, it is possible to view and check, for example, the fastening state of a fastening member provided in the suspension tower.

The vehicle according to the present disclosure has an excellent effect that workability at the time of checking can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
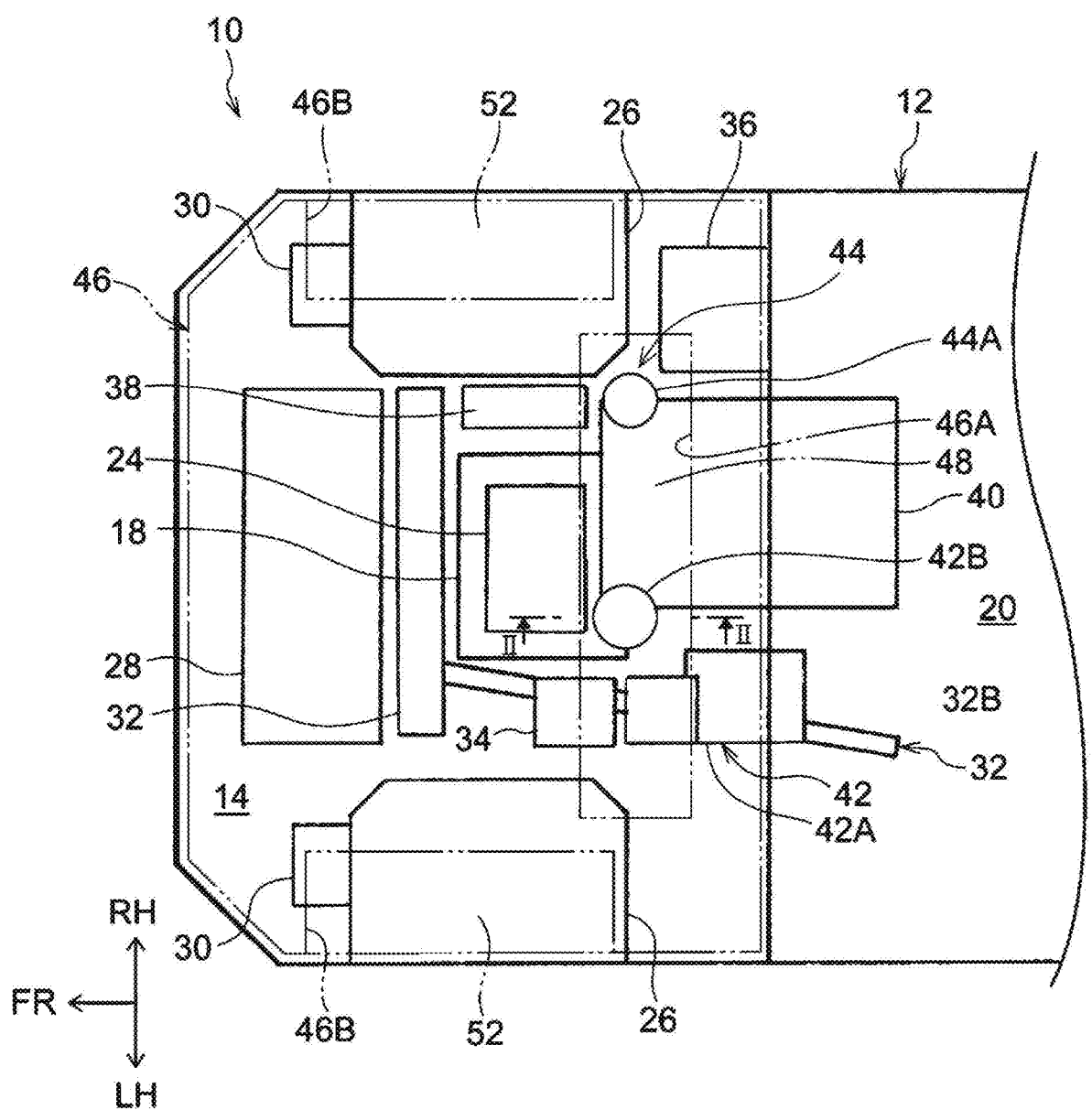
FIG. 1 is a plan view schematically showing a front part of a vehicle.

A vehicle 10 according to an embodiment of the present disclosure will be described with reference to FIGS. 1 and 2. Note that the arrow FR appropriately shown in the drawings indicates the front side in the vehicle front-rear direction, the arrow UP indicates the vehicle up-down improvement side, the arrow RH indicates the right side in the vehicle width direction, and the arrow LH indicates the left side in the vehicle width direction. In addition, in the following description, only the front-rear direction, the left-right direction, and the up-down direction are used, unless otherwise specified, the front-rear direction of the vehicle front-rear direction, the left-right direction of the vehicle left-right direction (vehicle width direction), and the up-down direction of the vehicle vertical direction are shown.

As shown in FIG. 1, a power unit room 14 is provided at a front portion of a vehicle body 12 constituting the vehicle 10 of the present embodiment. Various in-vehicle devices described later in detail are provided in the power unit room 14.

Here, a pair of left and right suspension towers 26 that bulge toward the power unit room 14 side are provided on both side portions of the power unit room 14 in the vehicle width direction. A front wheel or the like is provided on the lower side of the pair of left and right suspension towers 26.

In the power unit room 14, a main cooling device 28, an air conditioner 40, a brake device 42, and a washer device 44 are provided. The main cooling device 28, the air conditioner 40, the brake device 42, and the washer device 44 are examples of in-vehicle devices. Various devices 18, 24, 28, 32, 34, 36, and 38 constituting the vehicle are provided in the power unit room 14.

The main cooling device 28 includes two reserve tanks 30 serving as a liquid amount checking unit. In the present embodiment, one reserve tank 30 is provided on the front side of the right suspension tower 26, and the other reserve tank 30 is provided on the front side of the left suspension tower 26. The reserve tank 30 stores coolant supplied to a radiator or the like. Further, the reserve tank 30 is provided with a memory (not shown) for checking the amount of the coolant stored in the reserve tank 30.

The air conditioner 40 is for adjusting the temperature in the cabin 20, and is formed in a box shape in which a fan for blowing air into the cabin 20, a fan motor, and a heat exchanger are stored. The air conditioner 40 penetrates the dash panel 22 in the front-rear direction. Accordingly, a part of the air conditioner 40 is disposed in the power unit room 14, and another part of the air conditioner 40 is disposed in the cabin 20. In the present embodiment, the air conditioner 40 is disposed between the shaft 32B and the auxiliary battery 36.

The brake device 42 includes a brake device main body 42A for operating the brakes of the respective wheels, and a brake reserve tank 42B serving as a fluid quantity checking unit in which the fluid (brake fluid) supplied to the brake device main body 42A is stored. The brake device main body 42A is provided on the rear side of the attitude control device 34 and the upper side of the shaft 32B. Further, the brake reserve tank 42B is provided on the right side with respect to the brake device main body 42A and on the upper side with respect to the left front end portion of the air conditioner 40. Here, as shown in FIG. 2, the brake reserve tank 42B is a container formed using a transparent member. The brake reserve tank 42B is provided with memories (not shown) for checking the fluid quantity of the brake fluid stored in the brake reserve tank 42B. Further, a replenishment port 42C for replenishing the brake fluid to the brake reserve tank 42B is provided at an upper portion of the brake reserve tank 42B. The replenishment port 42C is closed by a cap (not shown).

As shown in FIG. 1, the washer device 44 includes a washer tank 44A and a washer pump (not shown) provided in the washer tank 44A. The washer tank 44A is a liquid amount checking unit in which a cleaning liquid for cleaning the windshield glass or the like of the vehicle 10 is stored. The washer tank 44A is a container formed using a transparent member like the brake reserve tank 42B. An upper portion of the washer tank 44A is provided with memories (not shown) for checking the amount of the cleaning liquid stored in the washer tank 44A. Further, a refill port for refilling the washer tank 44A with the cleaning liquid is provided at an upper portion of the washer tank 44A. The refill port is closed by a cap (not shown). Further, in the present embodiment, the upper portion of the washer tank 44A is provided above the right front end portion of the air conditioner 40. Further, the upper portion of the washer tank 44A and the brake reserve tank 42B are arranged side by side in the left-right direction.

The power unit room 14 described above is covered from the upper side by the hood 46. By opening and closing the hood 46, it is possible to access the various in-vehicle devices described above.

Here, a rectangular central opening 46A that penetrates the rear portion of the hood 46 in the up-down direction is formed in the center portion in the left-right direction at the rear portion of the hood 46. With the hood 46 covering the power unit room 14 from above, the central opening 46A vertically overlaps the area from the top of the washer tank 44A to the brake device 42.

Further, cutout portions 46B are formed on both left and right sides of the middle portion of the hood 46 in the front-rear direction so as to open the outer side in the vehicle-width direction. When the hood 46 covers the power unit room 14 from the upper side, the cutout portion 46B on the right side vertically overlaps a range from the suspension tower 26 on the right side to the reserve tank 30 on the right side. Further, when the hood 46 covers the power unit room 14 from the upper side, the left cutout portion 46B vertically overlaps a range from the left suspension tower 26 to the left reserve tank 30.

Further, a central garnish 48 as a covering member for closing the central opening 46A is attached to the hood 46. The central garnish 48 is formed in a shape corresponding to the central opening 46A formed in the hood 46, and is detachably attached to the hood 46. In the present embodiment, as shown in FIG. 2, the clip 50 fixed to the central garnish 48 is locked to the clip locking portion 46C provided in the hood 46, so that the central garnish 48 is detachably attached to the hood 46.

Further, a pair of left and right side garnishes 52 as a cover member and a second cover member that respectively close the pair of left and right cutout portions 46B are attached to the pair of left and right suspension towers 26 constituting a part of the vehicle body 12. The pair of left and right side garnishes 52 are formed in shapes corresponding to the pair of left and right cutout portions 46B formed in the hood 46, and are detachably attached to the suspension tower 26. In the present embodiment, the clip fixed to the side garnish 52 is locked to the clip locking portion provided in the suspension tower 26, so that the side garnish 52 is detachably attached to the suspension tower 26.

Operation and Effect of Embodiment

Next, operations and effects of the present embodiment will be described.

Figure 2:
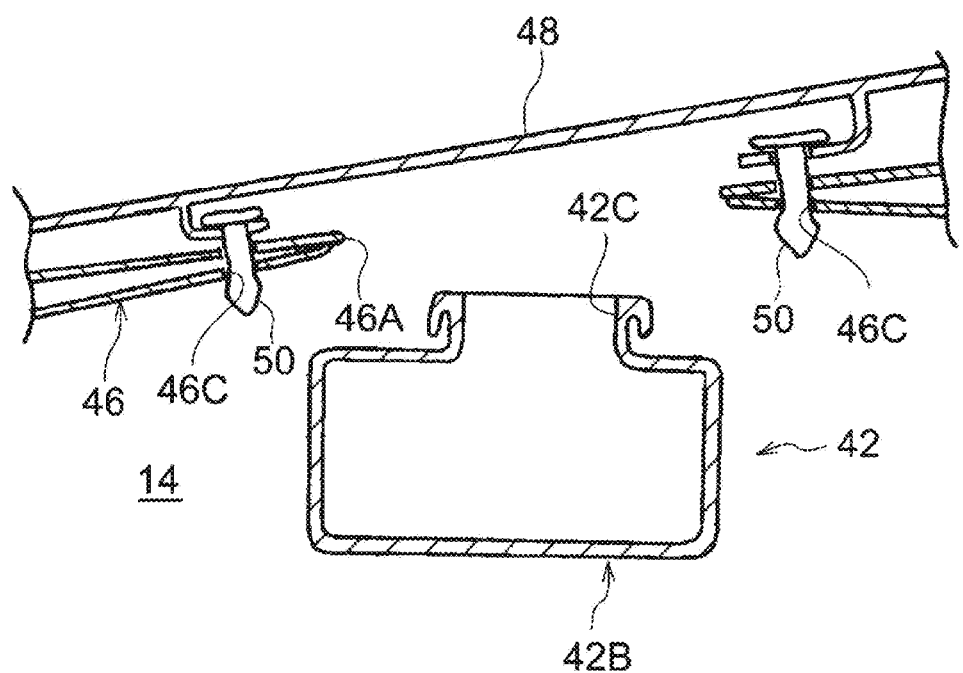
FIG. 2 is a cross-sectional side view schematically showing a cross section taken along II-II shown in FIG. 1.

As shown in FIGS. 1 and 2, in the present embodiment described above, when the central garnish 48 is removed from the hood 46, the brake reserve tank 42B and the upper portion of the washer tank 44A can be visually recognized through the central opening 46A formed in the hood 46. As a result, the amount of the brake fluid stored in the brake reserve tank 42B can be checked, checked, and refilled, and the amount of the cleaning liquid stored in the washer tank 44A can be checked, checked, and refilled. As described above, in the present embodiment, the amount of the brake fluid can be checked and checked without opening and closing the hood 46, and the amount of the cleaning liquid stored in the washer tank 44A can be checked and checked. Further, in the present embodiment, by removing one central garnish 48, it is possible to check, check, and refill the amount of liquid stored in a plurality of in-vehicle devices (the brake device 42 and the washer device 44).

In the present embodiment, the central garnish 48 is attached to the hood 46. In this configuration, the central garnish 48 may have a function as part of the hood 46.

Further, in the present embodiment, when the right side garnish 52 is removed from the right suspension tower 26, the right reserve tank 30 and the right suspension tower 26 can be visually recognized through the right cutout portion 46B formed in the hood 46. As a result, the amount of the coolant stored in the reserve tank 30 on the right side can be checked, checked, and refilled. In addition, a fastening state of a fastening member (for example, a fastening member for fixing the right coil over to the right suspension tower 26) provided in the right suspension tower 26 can be checked and checked. Similarly, when the left side garnish 52 is removed from the left suspension tower 26, the left reserve tank 30 and the left suspension tower 26 are visible through the left cutout portion 46B formed in the hood 46. As a result, the amount of the coolant stored in the left reserve tank 30 can be checked, checked, and refilled. In addition, a fastening state of a fastening member (for example, a fastening member for fixing the left coil over to the left suspension tower 26) provided in the left suspension tower 26 can be checked and checked.

As described above, in the present embodiment, workability at the time of inspection of the vehicle 10 can be facilitated.

In the present embodiment, an example has been described in which the fastening state of the fastening member provided in the suspension tower 26 can be checked and inspected by removing the side garnish 52, but the present disclosure is not limited thereto. For example, the side garnish 52 and the cutout portion 46B may not be provided when there is a restriction such as a design of the front portion of the vehicle 10.

Further, in the present embodiment, an example has been described in which the side garnish 52 is detachably attached to the vehicle body 12 and the central garnish 48 is detachably attached to the hood 46, but the present disclosure is not limited thereto. For example, the side garnish 52 may be detachably attached to the hood 46, and the central garnish 48 may be detachably attached to the vehicle body 12. The side garnish 52 and the central garnish 48 may be detachably attached to at least one of the vehicle body 12 and the hood 46.

Further, in the present embodiment, a configuration has been described in which the central garnish 48 closes the central opening 46A formed in the hood 46, but the present disclosure is not limited thereto. For example, a notch may be provided at the rear end of the hood 46 so that the central garnish 48 closes the notch.

Further, in the present embodiment, an example has been described in which the amount of the liquid stored in the plurality of in-vehicle devices (the brake device 42 and the washer device 44) can be checked and inspected by removing one central garnish 48, but the present disclosure is not limited thereto. For example, the cover member for checking the amount of the liquid stored in the brake device 42 and the cover member for checking the amount of the liquid stored in the washer device 44 may be provided independently of each other.

Although an embodiment of the present disclosure has been described above, the present disclosure is not limited to the above, and it is needless to say that the present disclosure can be implemented with various modifications other than the above without departing from the gist thereof.

What is claimed is:

1. A vehicle comprising:
   a vehicle body including a power unit compartment at a front part of the vehicle;
   a plurality of in-vehicle devices provided in the power unit compartment, the in-vehicle devices including a plurality of fluid containers each of which is configured to allow stored liquid amount to be checked;
   a hood that covers the power unit compartment, the hood being provided with a plurality of openings, the openings are arranged to overlap with the fluid containers when viewed in a vehicle up-down direction; and
   a plurality of cover members provided independently of the hood, that is the cover members being attachable to and detachable from at least either of the vehicle body and the hood, and covering the respective openings, wherein
   the in-vehicle devices include a cooling device, a brake device, and a washer device,
   the fluid containers include a first reserve tank and a second reserve tank of the cooling device, a brake reserve tank of the brake device, and a washer reserve tank of the washer device, the brake reserve tank and the washer reserve tank being transparent, and
   the openings include a first opening arranged to overlap with the first reserve tank, a second opening arranged to overlap with the second reserve tank, a third opening arranged to overlap with the brake reserve tank and the washer reserve tank.

2. The vehicle according to claim 1, wherein the cover members are attached to the hood.

3. The vehicle according to claim 1, further comprising:
   a first suspension tower provided at a first side of the power unit compartment in a vehicle width direction; and
   a second suspension tower provided at a second side of the power unit compartment in the vehicle width direction, wherein
   the first opening and the second opening are further arranged to overlap with the first suspension tower and the second suspension tower, respectively, when viewed in the vehicle up-down direction.

4. The vehicle according to claim 1, wherein a shape of each of the openings is rectangular.

5. The vehicle according to claim 1, wherein
   the first reserve tank is provided at a left side of the power unit compartment in a vehicle width direction as viewed from rearward of the vehicle in a vehicle front-rear direction,
   the second reserve tank is provided at a right side of the power unit compartment in the vehicle width direction,
   the brake reserve tank is provided above a left front portion of an air conditioner in the vehicle width direction and the vehicle front-rear direction, the air conditioner provided in a rear side of the power unit compartment in the vehicle front-rear direction, and
   the washer reserve tank is provided above a right front portion of the air conditioner in the vehicle width direction and the vehicle front-rear direction.

* * * * *